(12) United States Patent
Sandberg et al.

(10) Patent No.: US 10,942,856 B2
(45) Date of Patent: Mar. 9, 2021

(54) SYSTEM, METHOD AND APPARATUS FOR SECURE FUNCTIONS AND CACHE LINE DATA

(71) Applicant: Arm Limited, Cambridge (GB)

(72) Inventors: Andreas Lars Sandberg, Cambridge (GB); Prakash S. Ramrakhyani, Austin, TX (US)

(73) Assignee: Arm Limited, Cambridge (GB)

( * ) Notice: Subject to any disclaimer, the term of this patent is extended or adjusted under 35 U.S.C. 154(b) by 128 days.

(21) Appl. No.: 16/395,935

(22) Filed: Apr. 26, 2019

(65) Prior Publication Data

US 2020/0341901 A1    Oct. 29, 2020

(51) Int. Cl.
| | |
|---|---|
| *G06F 12/0864* | (2016.01) |
| *G06F 12/0811* | (2016.01) |
| *H04L 9/06* | (2006.01) |
| *H04L 9/08* | (2006.01) |

(52) U.S. Cl.
CPC ...... *G06F 12/0864* (2013.01); *G06F 12/0811* (2013.01); *H04L 9/0643* (2013.01); *G06F 2212/1052* (2013.01); *H04L 9/0869* (2013.01)

(58) Field of Classification Search
None
See application file for complete search history.

(56) References Cited

U.S. PATENT DOCUMENTS

| | | |
|---|---|---|
| 5,530,958 A | 6/1996 | Agarwal et al. |
| 10,601,711 B1 | 3/2020 | Matthews et al. |
| 2006/0080732 A1 | 4/2006 | Ohkubo et al. |
| 2008/0225740 A1 | 9/2008 | Martin et al. |
| 2010/0030966 A1 | 2/2010 | Hirao et al. |
| 2014/0149723 A1 | 5/2014 | Junghans et al. |
| 2015/0058527 A1 | 2/2015 | Venkata |
| 2015/0121034 A1 | 4/2015 | Steele, Jr. et al. |
| 2015/0370720 A1 | 12/2015 | Rowlands et al. |
| 2018/0091426 A1 | 3/2018 | Bao et al. |
| 2018/0292995 A1 | 10/2018 | Tal et al. |
| 2018/0349280 A1 | 12/2018 | Prasad et al. |

OTHER PUBLICATIONS

K. Qureshi, Moinuddin. (2018). CEASER: Mitigating Conflict-Based Cache Attacks via Encrypted-Address and Remapping. 775-787.

*Primary Examiner* — Jared I Rutz
*Assistant Examiner* — Marwan Ayash
(74) *Attorney, Agent, or Firm* — Leveque IP Law, P.C.

(57) ABSTRACT

A system, apparatus and method for secure functions and manipulating cache line data. The method includes generating cache block addresses from a subset of bits, i.e. tag bits, of a cache address and hashing the cache block addresses with one or more secure functions that use keys to generate secure indexes.

13 Claims, 11 Drawing Sheets

SYSTEM, METHOD AND APPARATUS FOR SECURE FUNCTIONS AND CACHE LINE DATA

CROSS-REFERENCE TO RELATED APPLICATIONS

This application is related to the following co-pending U.S. patent application: application Ser. No. 16/395,897, entitled "SYSTEM, METHOD AND APPARATUS FOR SECURE FUNCTIONS AND CACHE LINE DATA," filed on even date herewith, which is incorporated herein in its entirety.

BACKGROUND

Caches can be indexed using a subset of bits in a physical address. While such indexing is very simple to implement in hardware it unfortunately has major drawbacks. First, reverse engineering is trivial, making it possible to implement prime and probe cache side-channel attacks (e.g., as a covert channel or in a speculation attack) in which physical addresses can be primed and then probed. Second, pathological conflicts in cache operations are very likely.

To implement a covert cache side-channel attack or a Spectre-style attack, in which the attacker gains information by covertly monitoring cache accesses made by the target, the attacker needs to understand the cache hash function. Traditionally, an index into a cache is calculated by directly taking several bits from an address and using that as an index. An example of an index portion of a physical address is shown in FIG. 1, where the address 102 includes three portions: tag 104; index 106; and block offset 108.

Reverse engineering the geometry of a cache is well understood and is typically done by scanning arrays of varying size and observing the access latency. These techniques typically rely on a single bit in the cache index corresponding to a single bit in the address.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
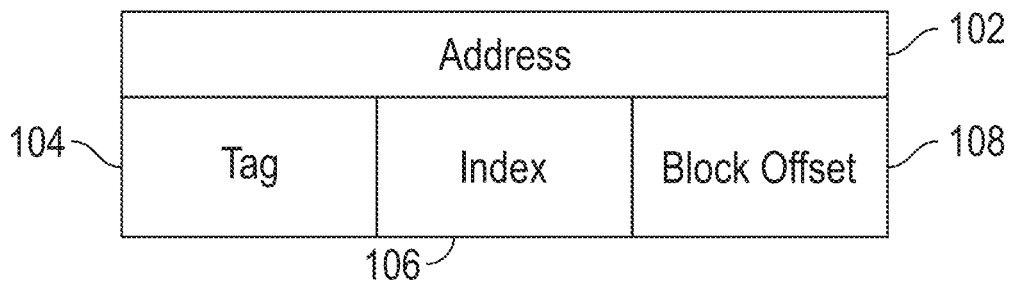
FIG. 1 is a diagram that illustrates how an address is split into components to perform a cache look-up.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms mean that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Now, therefore, in accordance with various embodiments described herein, using a strong hash function, or hash, makes it much harder to find hash collision(s), in which two inputs to a hash function produce the same hash result, that can be used for side channel attacks and reduces the likelihood of pathological conflict cases.

A cache block address, derived from a cache address such as a physical address, can be combined with a key and a secure function to make the secure function unique across reboots and systems. Dynamic re-keying can be implemented by using two hashes/keys in parallel, which further limits timing side channels.

To make reverse engineering harder, each cache address can be assigned to a random index in the cache at boot time. It is useful to approximate this using a secure function, such as a hash message authentication code (HMAC)-like function, and a key that is randomly generated, rendering the generated hash value unpredictable. The output of the secure function is then divided or parsed into components used to perform cache look-up.

Figure 2:
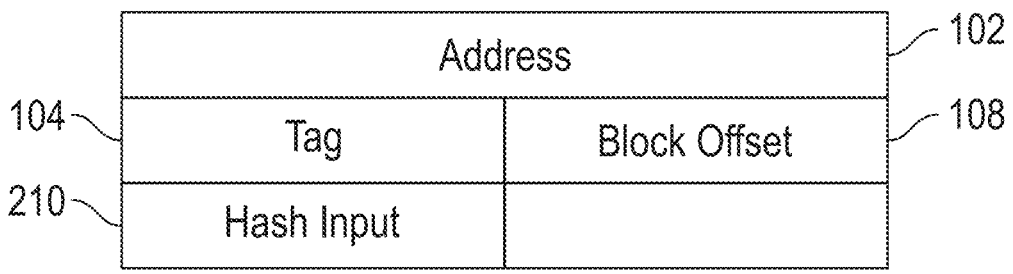
FIG. 2 is a diagram that illustrates how an address can be split into components used to perform a cache look-up, in accordance with embodiments of the disclosure.

As shown in FIG. 2, the address 102 has a tag portion 104, block offset portion 108 and hash input 210. The address 102 may be a physical address, virtual address, logical block address, or other portion of memory, or storage that can be accessed. The block offset portion 108, or offset, is typically the lower bits of the address, such as bits 0-6. The tag portion 104 is typically the higher bits, such as bits greater than 6. Tags are added to the cache to permit distinction between different memory locations that map to the same cache block.

The physical address can be secured with a hash output function, for example, a QARMA encryption operation that encrypts the physical address ("PA") with a random key. Additionally, the secure function can cause the address to be non-reconstructable so that the address cannot be reverse engineered or decoded. The tag may be matched to the full physical address portion less the offset portion.

In addition to making timing side channels harder to exploit, adding entropy to the hash function also reduces the likelihood of pathological cache conflicts. A direct-mapped cache using a strong index approximates a fully-associative random replacement cache.

Strong hash functions may take several cycles to compute. It has been discovered and disclosed herein that a strong hash is only significant for shared cache levels (ignoring time multiplexing which can be solved by flushing private caches on a context switch). This makes it possible to compute the strong hash in parallel with the look-up in the private caches and then propagate the hash with the request.

Figure 3:
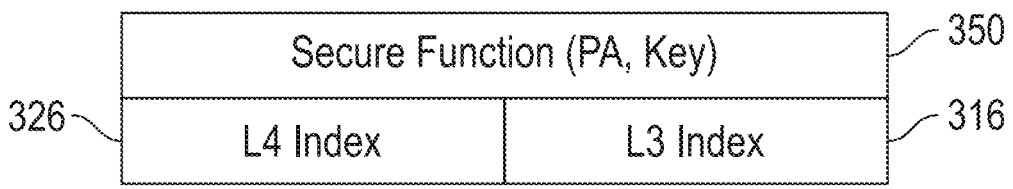
FIGS. 3 and 4 are diagrams that illustrate that a secure function, or part of a secure function, can be used at different shared cache levels, in accordance with various representative embodiments.

The secure function, or part of the secure function, can then be used at different shared cache levels. For example, as shown in FIG. 3, if index L3 (316) and index L4 (326) of key 350 use a secure function, these indexes (316, 326) can either use different bits from the original function or overlapping bits, as shown in FIG. 4.

Figure 4:
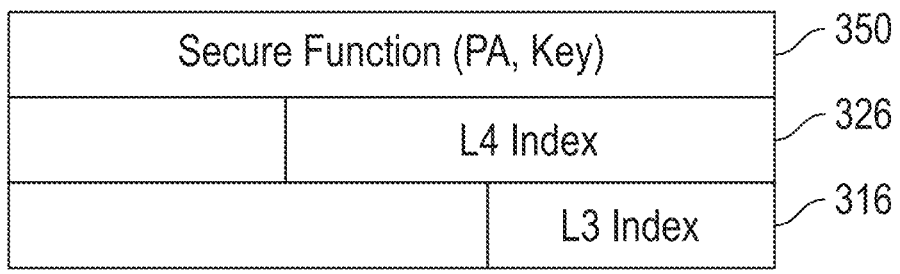

Indeed, FIG. 4 shows the use of overlapping bits for indexes L3 (316) and L4 (326). It can be seen from these examples that a secure index can be a portion or part of an output produced by a secure function.

There is typically a trade-off between security (more difficult to find collisions if the hashes do not overlap) and interconnect cost due to the additional bits required to propagate the hash.

Figure 5:
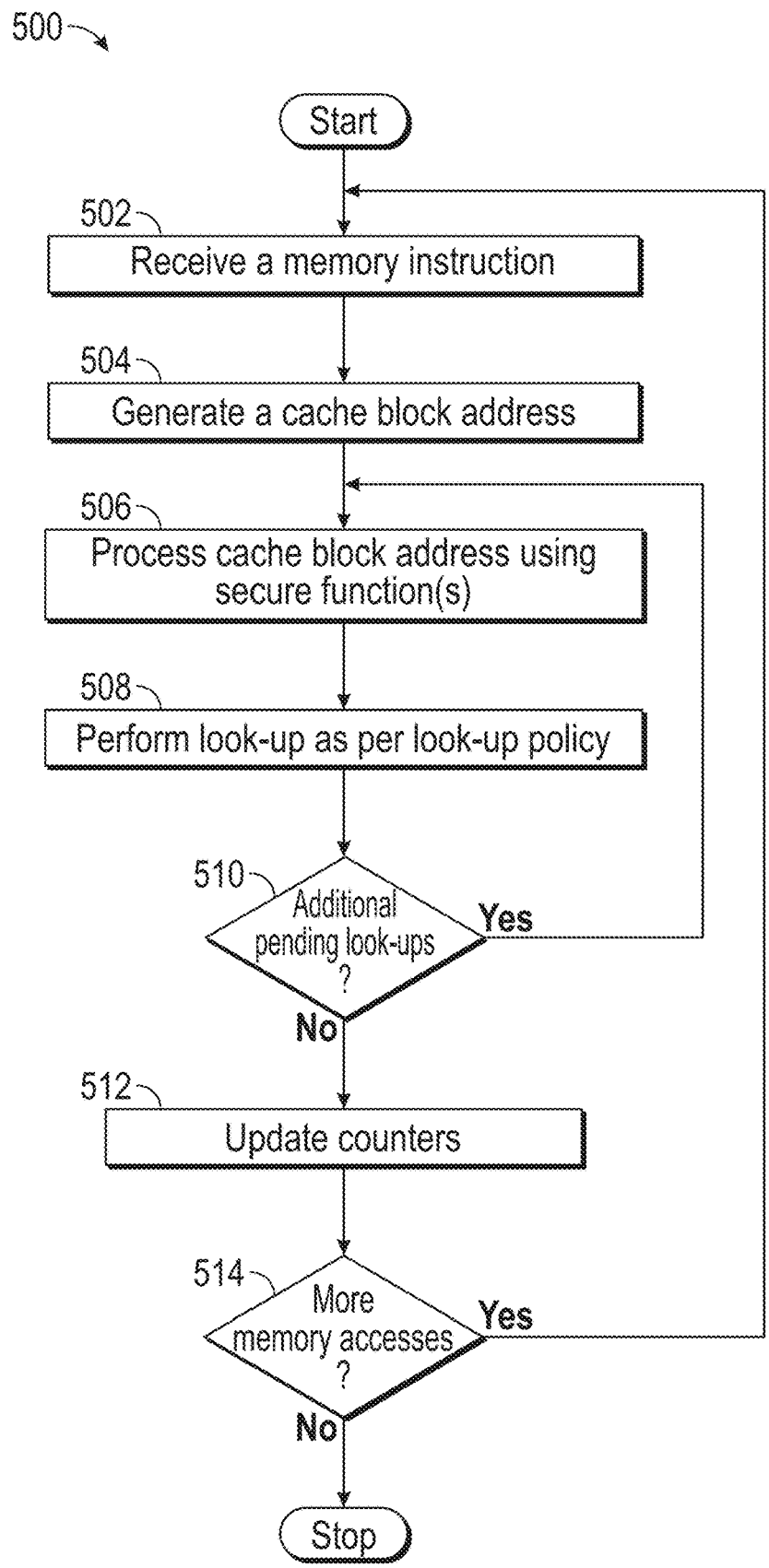
FIG. 5 illustrates a flowchart according to a representative embodiment.

FIG. 5 is a flowchart 500 that illustrates the use of one or more secure functions in performing cache look-ups, in accordance with various embodiments of the disclosure. Program instructions suitable for carrying out the flowchart, or some portion thereof, may be stored on non-volatile memory or other suitable memory or computer-usable medium and in any suitable programming language. As used herein, the term flowchart is understood to be a type of diagram that represents an algorithm, flow, workflow, operation or process.

In addition to using one or more secure functions, at least two secure functions active at any given time may be used in dynamic re-keying to further limit side channel attacks. Each secure function is used to protect the security of the key and cache mapping; each secure function may be used to generate and/or protect the key from reverse decoding.

These secure functions may be a hash function or other suitable function. While hash functions are one example of a suitable secure function, any secure function may be used, and the present disclosure is not limited to hash functions. Any suitable function that may be encoded, encrypted, non-reversable, non-reconstructable, non-invertible, or that generates an unpredictable value, may be a secure function.

Where two secure functions are utilized, one secure function may be designated as the incoming secure function and can be used for fills. A second secure function may be designated as an outgoing secure function. Data installed using the outgoing secure function will, over time, be migrated to the new (incoming) secure function.

Specifically, the flow 500 of FIG. 5 starts when a memory instruction is received (502), the memory instruction having an associated cache address. As previously noted, the cache address can be a physical address having a number of bits, the lowest of which are referred to as the block offset while the bits of the physical address adjacent to and higher than the block offset are referred to as the tag portion of the address. The designations of the cache address may be based on a bit number, or bit range. For example, bits 0-6 may be used for the block offset and bits 7-47 may be used for the tag portion of the cache address. These bit assignments or designations may vary based on the size of the cache address, offset, tag and index portions of the cache address.

A cache block address (CBA) is next generated (504) from the cache address of the received memory instruction. This cache block address can be generated by utilizing only a portion of the address, such as only the tag portion of a physical address; the block offset portion of the address is not used; the offset, or block offset, portion of the cache line is excluded, or not used, to generate the cache block address of the cache line. While a physical address is described as the source for a cache address, other types of addresses may also be used, for example a virtual address or logical block address. As used herein, the term cache line refers to the block of data stored in a cache.

One or more secure functions (a) . . . (n), where "n" is any suitable number, are used to process the generated cache block address (506). The secure functions may be hash functions, or other suitable encoded, encrypted, ciphered or cryptographic functions. A secure function may be any function that is non-invertible, and therefore cannot be reverse engineered, and may be any function that can be used to map data of arbitrary size to data of a fixed size. The values returned by a hash secure function, e.g. hash function, are called hash values, hash codes, digests, or simply hashes. Hash functions are often used in combination with a hash table, a data structure used in computer software for rapid data look-up. They are also useful in cryptography. A cryptographic hash function allows one to easily verify that some input data maps to a given hash value, but if the input data is unknown, it is deliberately difficult to reconstruct it (or any equivalent alternatives) by knowing the stored hash value. Hash functions are therefore used for assuring integrity of transmitted data, and are the building blocks for HMACs, which provide message authentication.

Secure functions may be designated as an incoming secure function or an outgoing secure function depending on any one or more of a timer, cycle frequency and/or counter, such as a saturation counter. The timer may be set up to track time intervals, count-up, or count-down, or count a number of cycles, or an access timer that tracks the number of cache misses, cache hits, or cache accesses. The timer can either be an approximation of wall-clock time (e.g., a cycle counter) or an access timer (e.g., cache misses, hits, or accesses).

A cache miss is a failed attempt to read or write a piece of data in the cache, which results in a main memory access with much longer latency. There are three kinds of cache misses: instruction read miss, data read miss, and data write miss.

Cache read misses from an instruction cache generally cause the largest delay, because the processor, or at least the thread of execution, has to wait (stall) until the instruction is fetched from main memory. Cache read misses from a data cache usually cause a smaller delay, because instructions not dependent on the cache read can be issued and continue execution until the data is returned from main memory, and the dependent instructions can resume execution. Cache write misses to a data cache generally cause the shortest delay, because the write can be queued and there are few limitations on the execution of subsequent instructions; the processor can continue until the queue is full.

Figure 14:
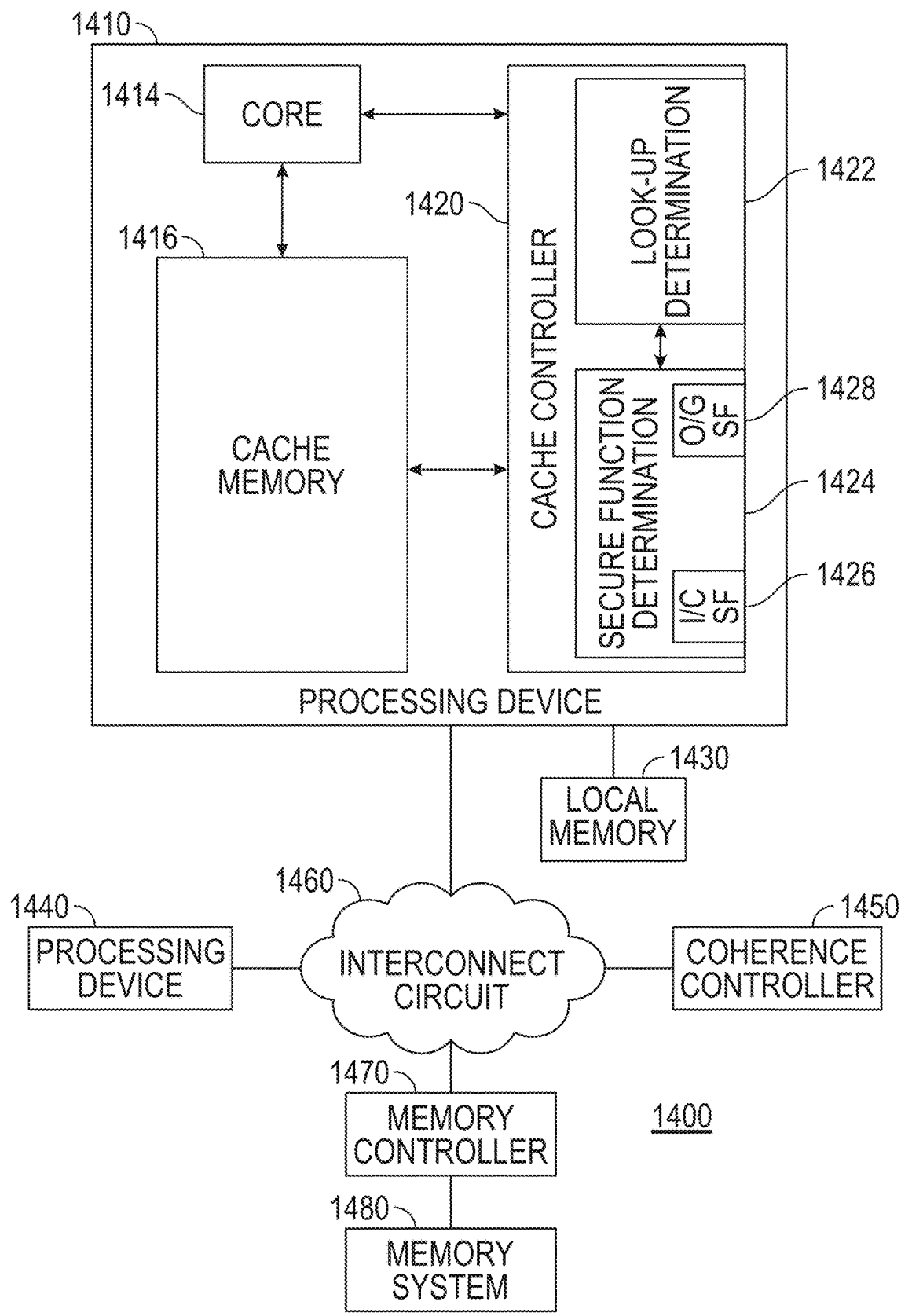
FIG. 14 is a diagrammatic representation of a data processing system, in accordance with various representative embodiments.

Secure functions may be updated and modified by a secure function determination, illustrated in FIG. 14, which may continuously update and/or modify secure functions. The modification of the secure function may be based on a variety of inputs received by a secure function determination, such as clock, counter and designation of an incoming (I/C) secure function/outgoing (O/G) secure function. As described herein, the secure function used to process the cache block address can also be changed based on the number of cycles, lines of data, time or other parameters. A secure function can continuously or periodically be changed, as described herein.

To make reverse engineering of the secure function, e.g. hash function, more difficult, a secure index of the cache line is generated based on processing the cache block address using one or more the secure functions (506), either the incoming secure function, the outgoing secure function or both during a transition between the two functions. This secure index is then used to manage cache access. A cache look-up per the look-up policy associated with the secure index is performed (508). This process is described more fully in FIG. 6. The inquiry at decision block 510 is whether there are additional, pending look-ups to perform. If yes, the flow returns to 506; if no, the flow continues to block 512. After the cache look-ups are performed, counters corresponding to the secure functions used to process the cache block address are updated (512). Updating the counter(s) is described more fully in connection with FIG. 9. At decision block 514, the inquiry is whether there are more memory accesses. If yes, the flow returns back to block 502. If not, the flow ends.

Figure 6:
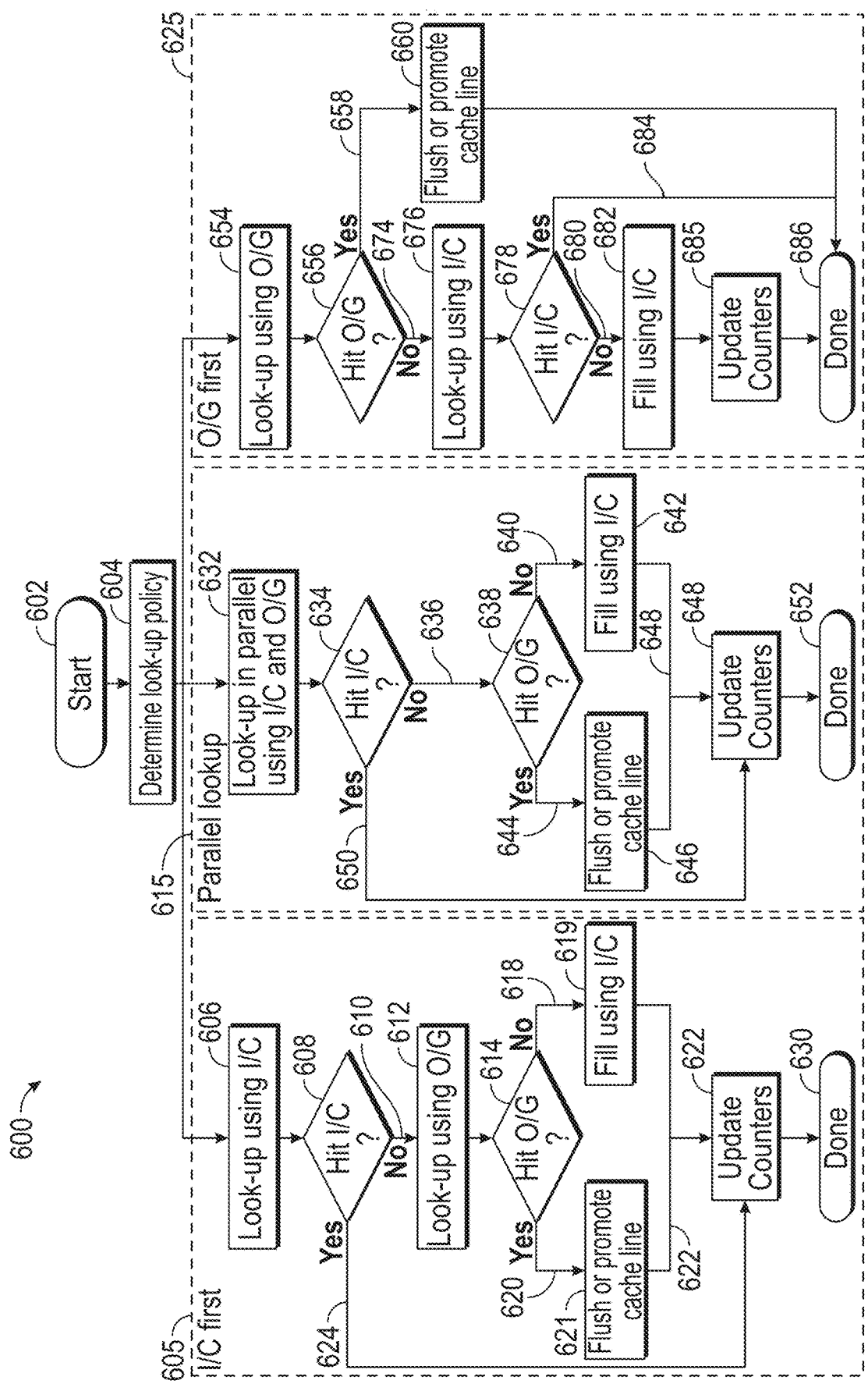
FIG. 6 illustrates a flowchart according to another representative embodiment.

FIG. 6 shows that a number of flows can be used to perform a cache look-up using incoming and outgoing secure functions, in accordance with the disclosure. Program instructions suitable for carrying out these various look-ups, or some portion thereof, may be stored on non-volatile memory or other suitable memory or computer-usable medium and in any suitable programming language.

The flow 600 starts (602) and shows that cache look-ups can use one of the following strategies, represented by flows 605, 615, and 625:
  Cache look-up using the incoming secure function to generate an index first (605);
  Cache look-up using the outgoing secure function to generate an index first (625); and
  Cache look-up using both secure functions (incoming secure function and outgoing secure function) at the same time, e.g. a parallel look-up, advantageous where the look-ups go to different memory banks (615).

Specifically, as shown in FIG. 6, diagram 600 shows three paradigms (605), (615) and (625) for cache look-ups in accordance with the various embodiments of the disclosure. The paradigms start (602) and a cache look-up policy is determined (604). Depending on the policy to be used, a look-up using an incoming secure function first (605) may be implemented, a parallel look-up (615) may be implemented first, or a look-up using an outgoing secure function first (625) may be implemented. Each of these paradigms are discussed further herein, with FIGS. 7 and 8 describing how the look-up policy is determined, in accordance with the number of counters that are employed.

When a cache look-up using the incoming secure function first is implemented (605), a look-up using the incoming secure function (606) is performed. A determination is made about whether the look-up using the incoming secure function is a hit (608). If the look-up using the incoming secure function is not a hit (610), the look-up is performed using the outgoing secure function (612), as shown. A determination is made about whether the look-up using the outgoing secure function is a hit (614). If "yes" (620), the cache line is either flushed or promoted (621). If, however, the look-up using the outgoing secure function is not a hit (618), a fill is performed using the incoming secure function (619) as shown.

Referring back to decision block (608), if the cache look-up using the incoming secure function is a hit (624), the process of a look-up using the incoming secure function (605) continues to (622).

Irrespective of whether a cache line is flushed, promoted or filled, the counters corresponding to the secure functions in flow 605 are updated (622) before the process is complete (630).

Where the cache look-up policy identified (604) indicates that both incoming and outgoing secure functions are to be employed in a parallel look-up, flow 615 in which cache look-up using both the incoming secure function and outgoing secure function is performed (632) is indicated.

A determination is made about whether the look-up performed using the incoming secure function is a hit (634). If the incoming secure function is not a hit (636), the flow continues to decision block (638) where a determination is made about whether the look-up performed using the outgoing secure function at (632) is a hit. If yes (644), the cache line is either flushed or promoted (646). If, however, the look-up using the outgoing secure function performed at (632) is not a hit (640), a cache line fill is performed using the incoming secure function (642).

Referring back to decision block 634, if the look-up using the incoming secure function performed at (632) is a hit, the flow (650) proceeds to update the counters (648)

Regardless of whether there is a flush, promotion or fill of the cache line, the process is complete (652) after the counters corresponding to the secure functions in flow 615 are updated (648).

Where the look-up policy at (604) states that the look-up is to use the outgoing secure function first, flow (625) is indicated and a look-up using the outgoing secure function is performed (654).

At decision block (656) a determination is made about whether the look-up performed using the outgoing secure function is a hit (656). If no (674), a look-up using an incoming secure function is performed (676) as shown. Next, a determination is made about whether the look-up performed using the incoming secure function is a hit at decision block (678). If the look-up using the incoming secure function is not a hit (680), a cache line fill is performed using the incoming secure function (682) before updating the counters (685) as shown. If, however, the look-up using the incoming secure function is a hit (684), the flow continues directly from decision block (678) to update the counters (685).

Referring back to decision block (656) and the determination of whether the outgoing secure function is a hit (656), if the look-up using the outgoing secure function is a hit (658), the cache line is either flushed or promoted (660) and the flow continues thereafter to (685) where the counters are updated. Irrespective of whether a cache line is flushed, promoted or filled, the counters corresponding to the secure functions in flow 625 are updated (685) before the process is complete (686).

From the foregoing, it will be appreciated that whether a flush, promotion or fill of a cache line is used by the various processes to perform a cache look-up are complete (630), (652), (686) only after incoming and/or outgoing counters corresponding to the incoming and/or outgoing secure functions of the processes 605, 615, and 625 are updated (622), (648), and (685), respectively. How the counters are updated is described in connection with FIG. 9, below.

It is also an embodiment that there is more than one incoming secure function and more than one outgoing secure function operating at any given time. Thus, for illustrative purposes, the description described having one outgoing secure function and one incoming secure function; however, it is understood and contemplated that any suitable number of secure functions, both incoming and outgoing, may be used at the same time.

A secure function itself can be retired once all cache lines associated with the function have been flushed and/or promoted. This can be accomplished by scanning the cache and forcing promotions and/or flushes of cache lines that were installed using the outgoing secure function.

It is an embodiment that upon retirement of the outgoing secure function, the incoming secure function will take the place of the outgoing secure function and may be the only secure function that is active. At this point, the incoming secure function becomes the outgoing secure function and a new incoming secure function is generated. Thus, as the outgoing secure function is retired, the incoming secure function takes on the role of an outgoing secure function and a new incoming secure function is generated.

Thus, it is an embodiment of the disclosure that only one secure function is operative at a time since there may a point in time that only one function is active.

As described herein, retirement of the outgoing secure function may be based on a fixed number of accesses of the cache since the incoming secure function was configured, or when the number of lines using the outgoing secure function has reached a threshold. A counter, such as an outgoing counter, may be used to determine use of the outgoing secure function. The retirement of the outgoing secure function can be implemented by either promoting remaining lines to the incoming secure function or by flushing the remaining lines from the cache.

Counters associated with a secure function are updated when promoting a cache line (the cache line will be re-installed using the incoming secure function (I/C function)) and filling. Depending on the counter implementation, retiring a cache line (or evicting one as a consequence of installing another one) may result in a counter decrement. Decrementing counters would be useful when multiple counters are used since they are not reset when a new secure function is introduced.

As described herein, retirement of the outgoing secure function may be based on a predefined, i.e. fixed, number of memory accesses since the incoming secure function was configured or when the number of cache lines using the outgoing secure function reaches a threshold. The retirement of the outgoing secure function can be implemented by either promoting remaining lines to the incoming secure function or by flushing them from the cache.

Thus, as described above, if a look-up using the outgoing secure function results in a hit, the cache line is moved to the location indicated by the incoming secure function. This ensures that reused data is eventually migrated to the incoming secure function.

Figure 7:
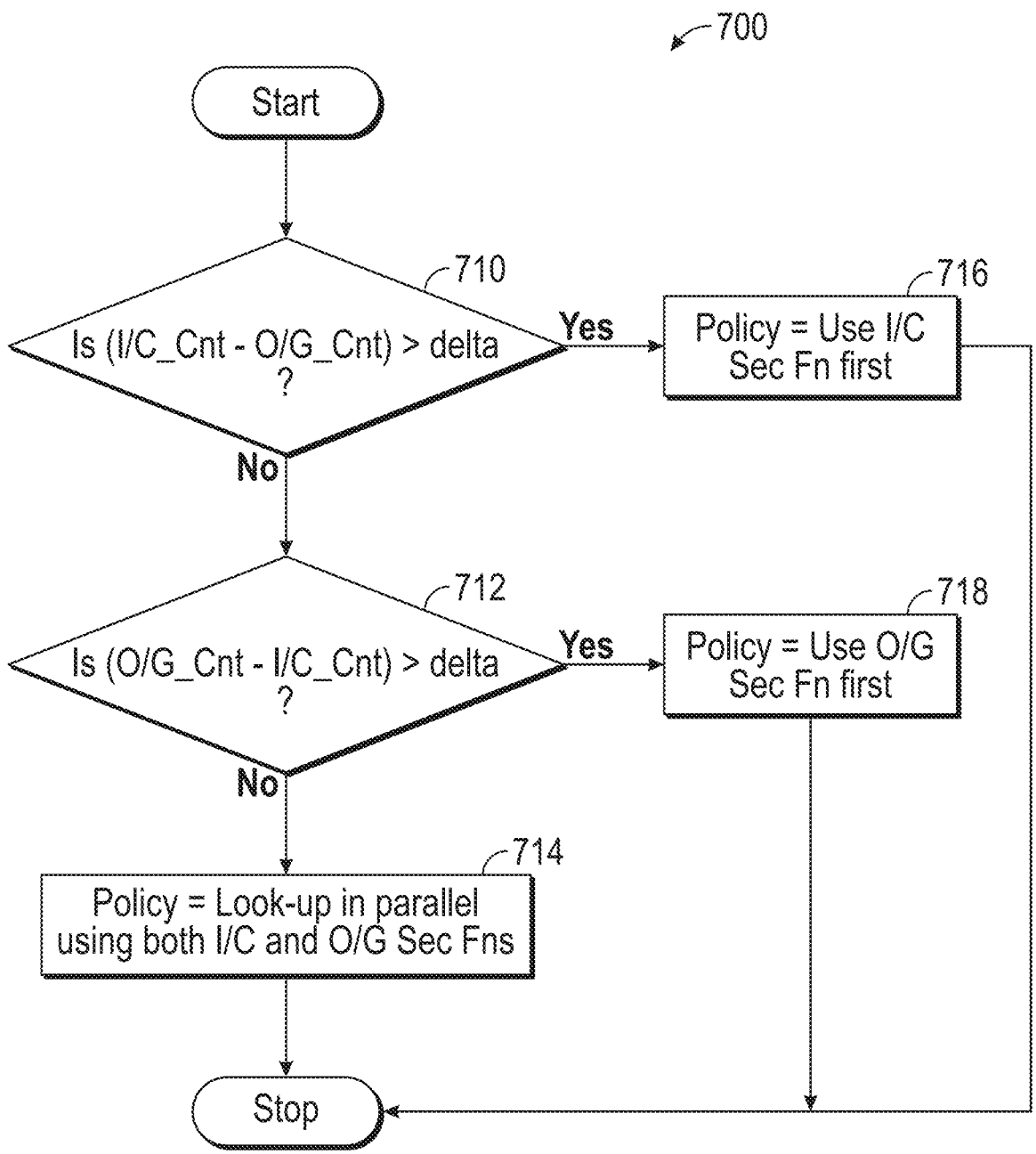
FIG. 7 is a flowchart that illustrates how to determine cache look-up policy when multiple counters are used, in accordance with various embodiments of the disclosure.

FIG. 7 is a flowchart 700 that illustrates an example of determining a look-up policy when multiple counters are used, in accordance with embodiments of the disclosure. Program instructions suitable for carrying out flow 700, or some portion thereof, may be stored on non-volatile memory or other suitable memory or computer-usable medium and in any suitable programming language.

In accordance with certain embodiments, multiple counters, such as saturating counters having maximum and minimum values, in the cache can be used to keep track of which look-up strategy is more likely to result in a hit. One implementation could use a saturating counter per secure function that is incremented when a line is installed using the secure function and decremented when a line is evicted. The evicted line could be an earlier installed line or the most recently installed line. Thus, the counter can track the status of cache lines and/or secure functions or a combination of both.

Based on the counters, different cache look-up strategies can be used:

Similar value: Prefer look-up functions in parallel if possible.

Incoming count larger: Look-up using incoming secure function first.

Outgoing count larger: Look-up using outgoing secure function first.

Referring back to FIG. 7, at decision block 710 the outgoing counter value O/G_Cnt is subtracted from the incoming counter value I/C_Cnt to determine if a resultant first operation value is larger than a delta value, where delta can be any value; in accordance with certain embodiments delta is zero. If yes, then the look-up policy is to use the incoming secure function I/C secure function first (716). If not, the flow continues to decision block 712, where the inquiry is whether subtracting the incoming counter value I/C_Cnt from the outgoing counter value O/G_Cnt yields a second operation value that is greater than delta. If yes, than the look-up policy is to use the outgoing O/G security function first (718). If however, the answer is no, this indicates that the counter values are similar or equal. The flow then continues to 714 where the look-up policy is to perform the look-up using both the outgoing and incoming secure functions. The incoming and outgoing counter values may be retrieved from a register in the cache controller in which they are stored; a representative cache controller is shown and described in FIG. 14.

Figure 8:
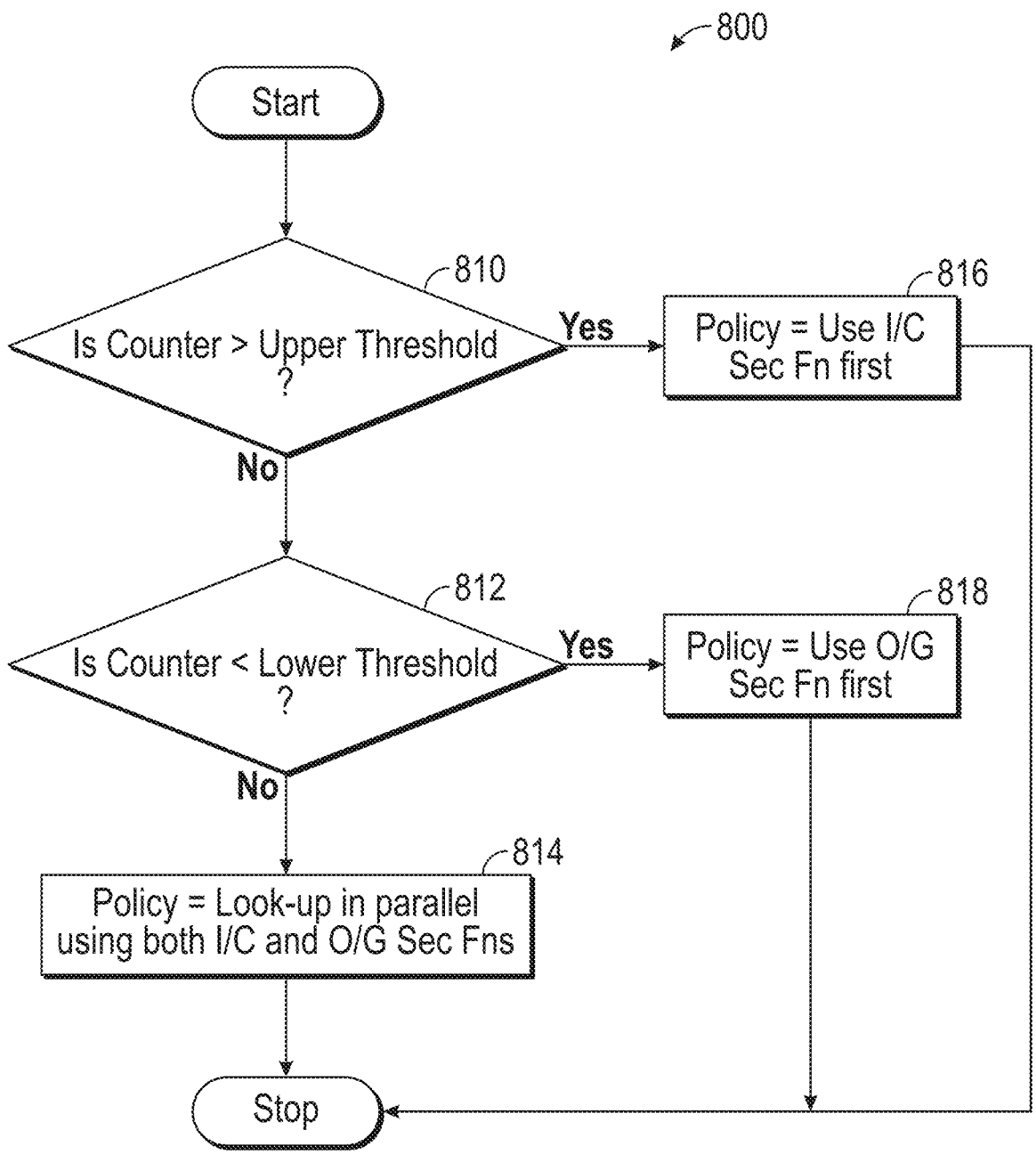
FIG. 8 is a flowchart that illustrates how to determine cache look-up policy when one counter and two secure functions are used, in accordance with various embodiments of the disclosure.

FIG. 8 is a flowchart 800 that illustrates how to determine the cache look-up policy when one counter and two secure functions are used, in accordance with various embodiments of the disclosure. The single counter, which may be a saturating counter, is used to select between two secure functions. The single counter is set to zero when a new incoming secure function is installed. As used herein, the counter may be a single counter that is incremented when the incoming secure function is used to install a cache line and reset when a new incoming secure function is installed.

Program instructions capable of carrying out flowchart 800, or some portion thereof, may be stored on non-volatile memory or other suitable memory or computer-usable medium and in any suitable programming language.

As shown in FIG. 8, at decision block 810, the inquiry is whether the counter value of the counter is greater than an upper threshold? If yes, the look-up policy is to use the incoming secure function first (816). If no, then the flow continues to decision block 812. If the counter value of the counter is less than a lower threshold, then the policy is to use the outgoing secure function first (818). The flow would thereafter end. If, however, the counter value of the counter is not less than the lower threshold, the policy is to perform the cache look-up in parallel using both incoming and outgoing secure functions (814). The counter value may be retrieved from a register in the cache controller in it is stored; a representative cache controller is shown and described in FIG. 14.

When the counter value is larger than one-half the cache size, the look-up is performed using the incoming secure function first. When the counter value is smaller than one-half the cache size, the look-up is performed using the outgoing secure function first. Otherwise, both look-ups are performed in parallel (814).

Figure 9:
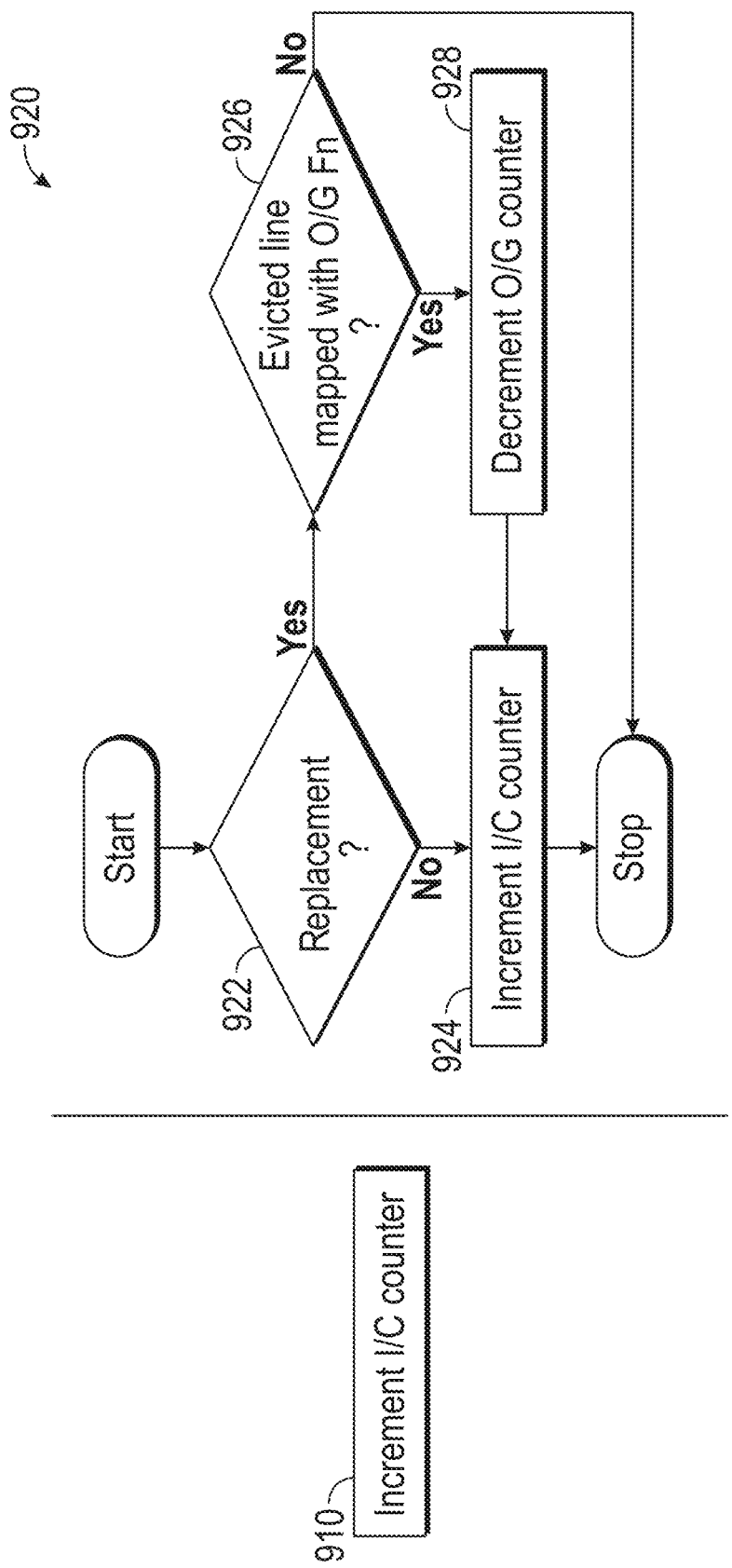
FIG. 9 is a flow chart that illustrates updating a counter or counter following performance of one or more cache look-ups, in accordance with embodiments described herein.

Reference is again made to block 512 of FIG. 5 and to blocks 622, 648, and 685 of FIG. 6, which are all concerned with updating of the counters following cache look-up operations, such as the flush, promotion, and/or fill cache line operations described above. Referring now to FIG. 9, flow diagram illustrates that the mechanism for updating a counter or counters following one or more cache look-ups depends on whether a single counter or multiple counters are used. When using just one counter, the update of the counter involves incrementing the counter 910, shown as increment of the incoming I/C counter. When using multiple counters, there is a choice to simply increment the incoming I/C counter of the incoming secure function 910 or to employ a more accurate process illustrated by flow diagram 920. The process employed by flow 920 allows more accurate tracking of how many cache lines are currently mapped with the incoming I/C secure function and how many are mapped with the outgoing O/G secure function. At decision block 922, if a cache line is a replacement, then the flow continues to decision block 926 and the inquiry is whether the evicted line was mapped with the outgoing O/G secure function? If no then the flow stops. If, however, the evicted line was mapped using the outgoing secure function, then the outgoing counter is decremented at 928 and the incoming counter is incremented at 924. The flow thereafter stops.

Referring back to decision block 922, if the cache line is not a replacement, then the flow continues directly to 924 where the incoming counter is incremented. The flow thereafter stops.

As described herein, a method and a structure that utilize strong index functions in order to prevent or mitigate cache side-channel attacks has been described.

Figure 10:
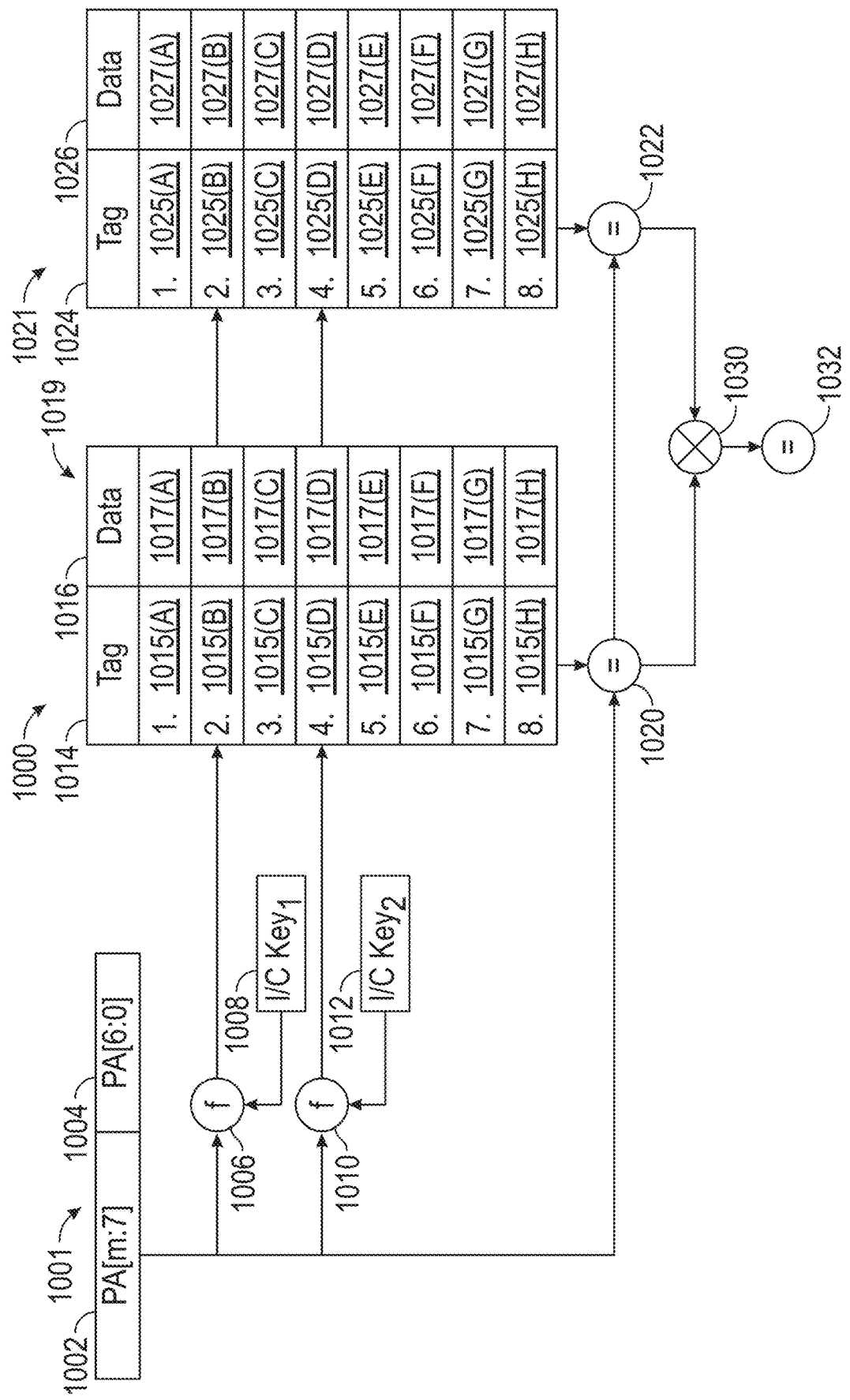
FIG. 10 illustrates look-up, in accordance with various representative embodiments.

FIG. 10 illustrates dynamic re-keying, e.g. re-hashing, using look-up. Block diagram 1000 of FIG. 10 shows address 1001, secure functions 1006, 1010, keys 1008 and 1012, RAMs 1019 and 1021 and circuits 1020 and 1022.

Address 1001 has two address portions PA[m:7] 1002 and PA[6:0] 1004, which is the offset portion (offset). While the address portions 1002 and 1004 are shown as physical addresses, these addresses may also be virtual addresses or logical block address, or other portion of memory that can be accessed. Secure functions 1006 and 1010 are shown as interfacing with tag RAM 1014 and data RAM 1016 and tag RAM 1024 and data RAM 1026.

Address portion 1002 is provided to two secure functions 1006 and 1010.

Secure function 1006, which may be the incoming secure function, utilizes first secure key 1008. Secure function 1010 may be an outgoing secure function. Secure function 1010 utilizes second secure key 1012.

Key 1008, which is shown as corresponding to the secure function 1006 and key 1012, which is shown as corresponding to secure function 1010, are typically random numbers generated upon creation of a new secure function. These keys 1008 and 1012 are used to generate the associated secure function. (Key 1008 generates secure function 1006 and key 1012 generates secure function 1010.)

While two keys (1008, 1012) and two secure functions (1006, 1010) are shown, it is an embodiment that any suitable number of secure functions, both incoming and outgoing, may be used. The number of secure functions is a design choice and the person of skill in the art will recognize that a plurality of secure functions may be used simultaneously.

Memory or storage modules 1019 and 1021 are configured to receive tag data (metadata bits) and data.

Memory module, RAM, or storage module 1019 includes tag storage portion 1014 and data storage portion 1016.

Tag storage location 1014 stores metadata bits which identify which specific address (among a subset of addresses) to which the associated data belongs. Tag storage 1014 has portions 1015(*a*) . . . (*h*). While eight locations are shown for this embodiment, other systems may use a number other than eight.

Data storage location in the cache 1016 stores data. Data storage 1016 has portions 1017(*a*) . . . (*h*). While eight locations are shown for this embodiment, other systems may use a number other than eight.

Memory module, RAM, or storage module 1021 includes tag storage portion 1024 and data storage portion 1026.

Tag storage location 1024 stores metadata bits which identify which address data belongs to a subset of addresses. Tag storage 1024 has portions 1025(*a*) . . . (*h*). While eight locations are shown for this embodiment, other systems may use a number other than eight. The output from secure function 1006 is used to select a designated portion (1015(*b*)) of RAM 1019 and a corresponding designated portion (1025(*b*)) of RAM 1021.

Data storage location in the cache 1026 stores data. Data storage 1026 has portions 1027(*a*) . . . (*h*). While eight locations are shown for this embodiment, other systems may use a number other than eight.

Circuit 1020 is a comparison circuit with multiplexing functionality that is used to perform two look-ups based on the tag RAM 1014. Circuit 1020 receives input from the cache address portion 1002. Circuit 1022 is a comparison circuit with multiplexing functionality that is used to perform two look-ups based on the tag RAM 1024 and address portion 1002.

While the above-description describes multiplexing between the two locations within the RAMs 1019 and 1021, it is also an embodiment of the present disclosure that multiplexing may be performed between the RAMs 1019 and 1021 themselves. That is, the circuit formed by RAMs 1019 and 1021 has two outputs from 1020 and 1022. These two outputs from 1020, 1022 may be multiplexed by multiplexor 1030 to produce output 1032.

Figure 11:
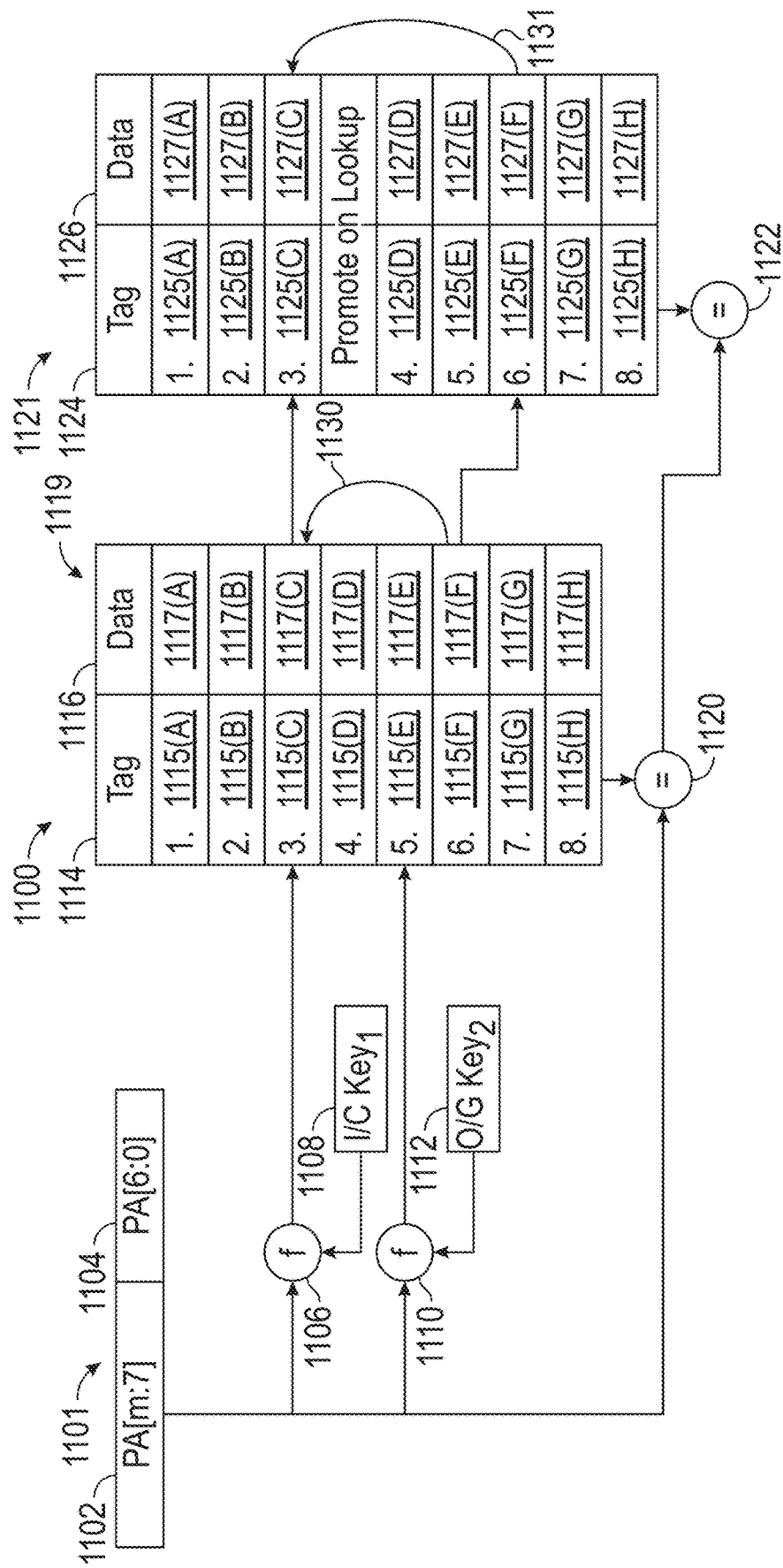
FIG. 11 illustrates dynamic re-hashing using promotion, in accordance with various representative embodiments.

FIG. 11 illustrates an embodiment 1100 of dynamic re-hashing using promotion on look-up. FIG. 11 shows cache line 1101, secure functions 1106, 1110, keys 1108 and 1112, RAMs 1119 and 1121, and circuits 1120 and 1122.

Cache line 1101 has two address portions PA[m:7] 1102 and PA[6:0] 1104, 1104 being the offset portion (offset). While the address portions 1102 and 1104 are shown as physical addresses, these addresses may also be virtual addresses or logical block addresses, or other addresses of a portion of storage that can be accessed. Secure functions 1106 and 1110 are shown as interfacing with tag RAM 1114 and data RAM 1116. Secure functions 1106 and 1110 also interface with tag RAM 1124 and data RAM 1126

Address portion 1102 is provided to two secure functions 1106 and 1110. Secure function 1106, which may be the incoming secure function, utilizes first secure key 1108. Secure function 1110 may also be described as an outgoing secure function. Secure function 1110 utilizes second secure key 1112.

Key 1108, which is shown as corresponding to the secure function 1106 and key 1112, which is shown as corresponding to secure function 1110, are typically random numbers generated upon creation of a new secure function. These keys 1108 and 1112 are used to generate the associated secure function. (Key 1108 generates secure function 1106 and key 1112 generates secure function 1110.)

Memory, or RAM, or storage modules 1119 and 1121 are configured to receive tag data (metadata bit) and data.

Memory module, RAM, or storage module 1119 includes tag storage portion 1114 and data storage portion 1116.

Tag storage location 1114 stores metadata bits which identify which address data belongs to a subset of addresses. Tag storage 1114 has portions 1115(*a*) . . . (*h*). While eight locations are shown for this embodiment, other systems may use a number other than eight.

Data storage location in the cache 1116 stores data. Data storage 1116 has portions 1117(*a*) . . . (*h*). While eight locations are shown for this embodiment, other systems may use a number other than eight.

Promotion look-up is illustrated by line 1130. The promotion look-up 1130 promotes the data associated with a secure function. As described herein, if there is a "hit" using the outgoing secure function (1110), the associated cache line located at 1117(*f*) and the corresponding tag located at 1115(*f*) are removed from their current location and placed in the data storage location 1115(*c*) associated with the incoming secure function (1106).

The embodiment shown in FIG. 11 shows that promoted lines stay in the same way, which is not necessarily the case. The promoted cache lines could be installed in another way of the cache if the cache controller determines that it is more beneficial (e.g., the cache line in that way was used less recently).

If the target location of a promotion contains a valid cache line that was installed using the outgoing secure function, that cache line may be promoted to a location indexed by the incoming secure function. This process continues until a cache line installed using the incoming secure function is replaced or the cache reaches a predetermined condition. Such a condition may be the resource load exceeding a predetermined threshold, a fixed recursion depth, or if the replacement policy indicates that the target is unlikely to be reused.

Thus, as shown in FIG. 11, data stored in RAM 1116 at location 1117(*f*) was placed there using outgoing secure function 1110 along with metadata stored in 1115(*f*) of tag register 1114. Upon look-up, the data located at 1117(*f*) is promoted to storage location 1117(*c*) of data RAM 1116 and tag located at 1115(*f*) is promoted to storage location 1115© of tag RAM 1114. Thus, since outgoing secure function 1110 resulted in a hit, the cache line 1117(*f*) was placed in a location (promoted) to a location (1117(*c*)) associated with incoming secure function 1106.

Memory module, or storage module 1121 includes tag storage portion 1124 and data storage portion 1126.

Tag storage location 1124 stores metadata bits which identify which specific address (among a subset of addresses) to which the associated data belongs. Tag storage 1124 has portions 1125(*a*) . . . (*h*). While eight locations are shown for this embodiment, other systems may use a number other than eight.

Data storage location in the cache 1126 stores data. Data storage 1126 has portions 1127(*a*) . . . (*h*). While eight locations are shown for this embodiment, other systems may use a number other than eight.

Circuit 1120 is a comparison circuit with multiplexing functionality that is used to perform two look-ups based on the tag RAM 1114 and address portion 1102. Circuit 1122 is a comparison circuit with multiplexing functionality that is used to perform two look-ups based on the tag RAM 1124 and address portion 1102.

Promotion, as described in relation to module 1119, is also applicable to memory module 1121. In this embodiment, the data would be promoted, as shown by line 1131, in the corresponding locations in RAM 1121.

Figure 12:
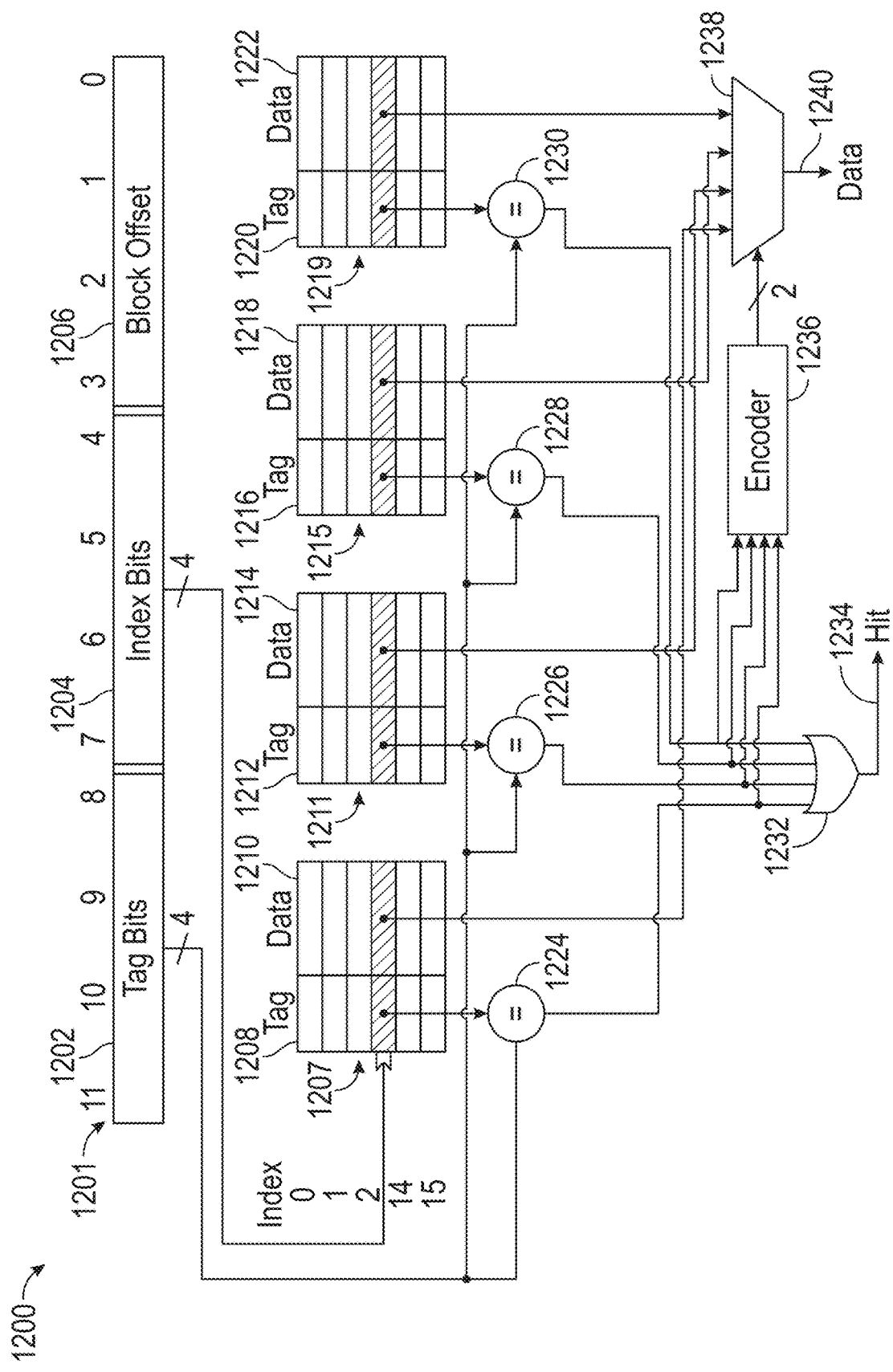
FIG. 12 illustrates address line processing in a set-associative cache.

FIG. 12 shows an example of cache line processing in a set-associative cache 1200 that includes cache address 1201 with block offset 1206, index bits 1204 and tag bits 1202. RAMs 1207, 1211, 1215 and 1219 having respective tag portions 1208, 1212, 1216 and 1220 and respective data portions 1210, 1214, 1218 and 1222.

Circuits 1224, 1226, 1228 and 1230 receive output from an associated RAM (1207, 1211, 1215 and 1219, respectively) and provide input to "OR" gate 1232. The output from logical OR gate 1232 shows a hit 1234.

Circuits 1224, 1226, 1228 and 1230 provide input to encoder circuit 1236. The output from encoder circuit 1236 is provided to circuit 1238. Circuit 1238 also receives, as input, data from data RAMs 1210, 1214, 1218 and 1222. The circuit 1238 outputs data 1240 as a function of the inputs from RAMs 1210, 1214, 1218 and 1222 and encoder circuit 1236.

Figure 13:
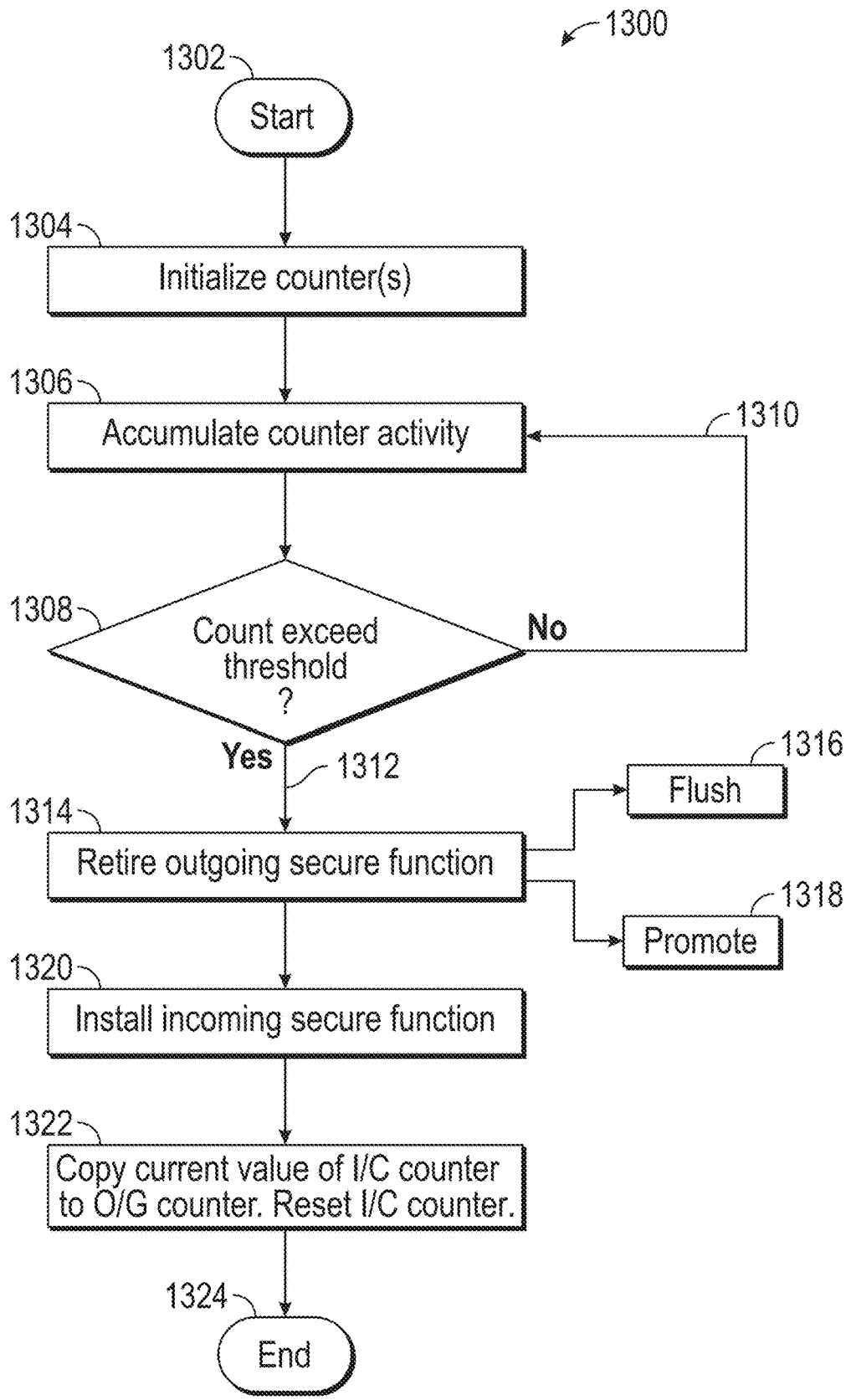
FIG. 13 is a flowchart that illustrates a promotion process, in accordance with representative embodiments.

FIG. 13 is a promotion process flowchart 1300, according to an embodiment described herein. The flow 1300 begins with start (1302). One or more counter(s) are initialized (1304). These one or more counters may be a saturation counter, timer, cycle counter, up-counter, down-counter or other suitable tracking or accumulating device or a combination of various types of counters. The timer can either be approximation of wall-clock time (e.g., a cycle counter) or an access timer (e.g., cache misses, hits, or accesses).

The activity of the one or more counters is accumulated (1306). This accumulation may be any suitable type of tracking or monitoring of the counter(s) to record the number of cycles, time elapsed, number of cache lines accessed or other suitable metric to audit the activity of the one or more counters.

A determination is made about whether the counter has exceeded a threshold value (1308). If not, "no" (1310) shows that the activity of the one or more counters continues to be accumulated (1306). If a determination is made that the one or more counters have exceeded a threshold quantity or value (1308) (e.g., that a fixed number of accesses since the function was configured, or a time has expired, or the number of cache lines using the outgoing secure function has reached a threshold), "yes" (1312) shows that the outgoing secure function is retired (1314). This can be implemented by either promoting remaining cache lines to the incoming secure function (1318) or by flushing them from the cache (1316). Flushing is likely to only have a small performance impact since cache lines with good locality will have been previously migrated.

As described herein, retirement of the outgoing secure function may be based on a predefined, i.e. fixed, number of memory accesses since the incoming secure function was configured or when the number of cache lines using the outgoing secure function reaches a threshold. The retirement of the outgoing secure function can be implemented by either promoting remaining lines to the incoming secure function or by flushing them from the cache.

Once the outgoing secure function has been retired, an incoming secure function is installed (1320). After installing a new incoming secure function, the current value of the incoming counter is copied to the outgoing counter. The incoming counter is reset according to the new incoming secure function (1322). The process then ends (1324).

As is apparent from the flowchart of FIG. 13, the process is iterative since the incoming secure function is subject to replacement by another incoming secure function. Indeed, it is an embodiment of the disclosure that upon installation of an incoming secure function, the counter is re-initialized and the incoming secure function is then defined as the outgoing secure function.

Referring now to FIG. 14, a diagrammatic representation of a data processing system 1400 in accordance with an embodiment of the present disclosure is shown. Processing devices 1410 and 1440 share a common data resource—memory system 1480 in this embodiment. Any number of processing devices and data resources may be present. The processing devices 1410, 1440 access memory system 1480 via an interconnect circuit 1460 and memory controller 1470. Memory access requests by processing devices 1410 and 1440 are monitored and handled by coherence controller 1450. A processing device, such as device 1410, may include one or more processing cores 1414, or processors, one or more cache memories 1416 and cache controller 1420. Coherence controller 1420 may send messages (referred to as 'snoop' messages) to other processing devices to retrieve, or change a coherence state of, data stored in a local cache of the processing device. A processing core may have access to one or more local memories 1430, such as additional caches or tightly coupled memory having a direct interface to the processing core.

More particularly with regard to cache controller 1420, a look-up determination controller 1422 and a secure function determination controller 1424 are provided, with the secure function determination controller 1424 have an incoming secure function generator element 1426 and an outgoing secure function generator 1428. As previously described, the cache controller 1420 may receive a memory instruction and generate a cache block address from an address of the memory instruction. The cache block address is comprised of the tag bits of the address but not the offset block, as previously described. The secure function controller 1424 processes the generated cache block address using one or more secure functions provided by secure function controller 1424 to generate one or more secure indexes. Incoming secure function generator 1426 can generate incoming secure functions while outgoing secure function generator 1428 generates outgoing secure functions. The generated secure functions may be updated and modified by secure function controller 1424, which may continuously update and/or modify secure functions. Modification of a secure function may be based on a variety of inputs received by a secure function controller 1424, such as clock, counter and designation of an incoming (I/C) secure function/outgoing (O/G) secure function. A secure function used to process the cache block address may also be changed by secure function controller 1424 based on the number of cycles, lines of data, time or other parameters. A secure function can continuously or periodically be changed.

Look-up controller 1422 of cache controller 1420 controls the processes described above in connection with FIG. 5, block 508 in which look-ups are performed in accordance with a look-up policy; FIG. 6, block 604 in which the look-up policy is determined; and more particularly FIGS. 7 and 8 in which details regarding determination of look-up policy dependent upon whether a single or multiple counters are used is set forth.

It will be appreciated that the system and structure presented in FIG. 14 can be used to eliminate cache side-channel attacks using strong index functions. More specifically, the structure and system illustrated in FIG. 14 can execute a method for secure data comprising generating, by at least one processor, a cache block address from a cache address, the cache block address having a plurality of tag bits of the address; and hashing, by the at least one processor, the cache block address with a secure function that uses an associated key to generate a secure index. The cache block address is generated from a tag portion of the address and not from an offset portion of the address. The key associated with the secure function is a randomly generated key.

Furthermore, the method can increment one or more counters, such as saturating counters, when a secure function is used to install a cache line; and reset one of the one or more saturating counters when a new secure function is initiated. It is also an embodiment to decrement one of the one or more counters when a cache line is evicted. The secure function is associated with one of the one or more saturating counters.

The embodiments described herein compute the secure function in parallel with a look-up in a cache. Furthermore, it is useful to re-key the one or more keys based on an incoming secure function and an outgoing secure function.

The method, as described herein, further comprises a dynamic cache look-up that can include using incoming secure functions and outgoing secure functions at approximately the same time, using the incoming secure function before using the outgoing secure function, or using the outgoing secure function before using the incoming secure function. Which look-up policy to use can be determined as a function of the number of counters that are used, with processing specific to the case whether a single counter or multiple counters are used with two secure functions.

Performing cache look-ups can be serially using an ordered sequence of secure functions, i.e. one at a time, or in parallel, at the same time, where parallel processing can enhance efficiency. Moreover, changing at least one of the one or more keys to rehash the one or more cache block addresses and generate a new index is also useful.

Any combination of one or more computer-usable or computer-readable medium(s) may be utilized in connection with the embodiments presented herein. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present embodiments are described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps or actions to be performed on the computer, or other programmable apparatus to produce a computer-implemented process such that the instructions which execute on the computer or other programmable apparatus, provide processes for implementing the functions/acts specified in the flowchart and/or block diagram block or blocks.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

The apparatus, system and methodologies presented herein provide an advancement in the state of the art.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some of the disclosed embodiments are set out in the following.

1. A method comprising: generating, by at least one processor, a cache block address from a cache address, the cache block address comprising a plurality of tag bits of the address; and hashing, by the at least one processor, the cache block address with a secure function that uses an associated key to generate a secure index.

2. The method of item 1, further comprising: performing a cache look-up in accordance with a look-up policy associated with the secure index; and updating a counter value of one or more counters associated with the secure function.

3. The method of item 2, further comprising: incrementing the one or more counters when the secure function is used to install a cache line; and resetting one of the one or more counters when a new secure function is initiated.

4. The method of item 3, further comprising decrementing one of the one or more counters when a cache line is evicted.

5. The method of item 1, where a subset of bits of the address from which the cache block address is generated comprises a tag portion of the address and does not comprise an offset portion of the address.

6. The method of item 1, further comprising generating the secure function while performing a cache look-up.

7. The method of item 1, further comprising performing cache look-ups serially using an ordered sequence of secure functions.

8. The method of item 1, further comprising changing at least one of one or more keys associated with the secure function to rehash the cache block address and generate a new secure index.

9. The method of item 8, further comprising moving a cache line that is currently indexed using an outgoing secure function to a location that is indexed by an incoming secure function.

10. The method of item 1, further comprising using the secure function based on a timer, where the secure function is changed upon an elapsed time of the timer.

11. A method comprising: generating, by at least one processor, a cache block address from a cache address, the cache block address comprising a plurality of tag bits of the address; generating, by the at least one processor, an incoming secure function; generating, by the at least one processor, an outgoing secure function; hashing, by the at least one processor, the cache block address with one or more of the incoming secure function and the outgoing secure function to generate one or more secure indexes; performing one or more cache look-ups in accordance with one or more look-up policies associated with the one or more secure indexes; and updating one or more counters associated with the incoming secure function and the outgoing secure function following performing the one or more cache look-ups.

12. The method of item 11, further comprising performing the one or more cache look-ups in accordance with a policy that uses the incoming secure function first to perform a first cache look-up.

13. The method of item 12, further comprising responsive to the first cache look-up generating a cache miss further comprising using the outgoing secure function to perform a second cache look-up and responsive to whether the second cache look-up generates a cache hit, performing one or more cache line operations.

14. The method of item 13, where responsive to the second cache look-up generating a cache hit performing one or more of flushing or promoting a cache line, otherwise performing a fill of the cache line using the incoming secure function.

15. The method of item 11, further comprising performing the one or more cache look-ups in accordance with a second policy that uses both the incoming secure function and the outgoing secure function to perform a cache look-up.

16. The method of item 15, responsive to a cache look-up using the incoming secure function generating a cache miss determining whether a cache look-up using the outgoing secure function is a hit and responsive to the determination performing one or more cache line operations.

17. The method of item 16, where responsive to the cache look-up using the outgoing secure function generating a cache hit performing one or more of flushing or promoting a cache line, otherwise performing a fill of the cache line using the incoming secure function.

18. The method of item 11, further comprising performing the one or more cache look-ups in accordance with a policy that uses the outgoing secure function first to perform a first cache look-up.

19. The method of item 18, where responsive to the first cache look-up generating a cache hit performing a flush or a promotion of a cache line, otherwise further comprising using the incoming secure function to perform a second cache look-up and responsive to the second cache look-up not generating a hit performing a cache line fill using the incoming secure function.

20. The method of item 11, further comprising determining which policy to use in performing the one or more cache look-ups: when a counter of the one or more counters is associated with both the incoming secure function and the outgoing secure function: responsive to a counter value of the counter being greater than an upper threshold value using a first policy to perform a cache look-up, responsive to the counter value of the counter being less than a lower threshold value using a third policy to perform the cache look-up, and responsive to the counter value of the counter being approximately equal to or less than the upper threshold value and approximately equal to or greater than the lower threshold value using a second policy to perform the cache look-up; and when an incoming counter is associated with the incoming secure function and an outgoing counter is associated with the outgoing secure function: responsive to a first operation value determined by subtracting a counter value of the outgoing counter from a counter value of the incoming counter being greater than a delta value using the first policy to perform a cache look-up, responsive to a second operation value determined by subtracting the counter value of the incoming counter from the counter value of the outgoing counter being greater than the delta value using the third policy to perform a cache look-up, and otherwise using the second policy to perform a cache look-up.

21. The method of item 11, where when the counter is associated with both the incoming secure function and the outgoing secure function updating further comprises incrementing the counter, and when the incoming counter is associated with the incoming secure function and the outgoing counter is associated with the outgoing secure function updating further comprises one or more of: incrementing the incoming counter associated with the incoming secure function; and responsive to the cache line being a replacement, decrementing the outgoing counter and incrementing the incoming counter if an evicted line was mapped with the outgoing secure function.

22. The method of item 11, further comprising: monitoring activity of one or more counters associated with the incoming secure function and the outgoing secure function; responsive to a count value of a counter of the one or more counters exceeding a threshold value: retiring the outgoing secure function, where the hashing excludes the outgoing secure function subsequent to retiring the outgoing secure function; installing a new incoming secure function; copying a current value of an incoming counter associated with the incoming secure function to an outgoing counter associated with the outgoing secure function; and resetting the incoming counter.

23. The method as itemed in item 22, where when the outgoing secure function results in a hit, further comprising moving a cache line to a location indicated by the incoming secure function.

24. The method of item 22, further comprising: retiring the outgoing secure function after one or more of a predefined number of accesses to the cache and the outgoing secure function has been used for a predefined number of cache lines.

25. The method of item 22, after retiring the outgoing secure function further comprising one or more of: promoting remaining cache lines to the incoming secure function; and flushing the remaining cache lines from the cache.

26. An apparatus, comprising: a cache memory; and a cache controller operatively coupled to the cache memory that has at least one processor, a look-up controller and a secure function controller, where responsive to a memory instruction access of the cache memory, the cache controller: generates a cache block address from a cache address of the memory instruction, the cache block address comprising a plurality of tag bits of the address; processes the cache block address with a secure function under control of the secure function controller that uses an associated key to hash the cache block address with the secure function and generate a secure index; performs under control of the look-up controller one or more cache look-ups in the cache memory in accordance with one or more look-up policies associated with the secure index; and updates one or more counter values of one or more counters associated with the secure function and under control of the cache controller after the one or more cache look-ups.

27. The apparatus of item 26, where the cache controller is operable to increment the one or more counters when the secure function is used to install a cache line, reset the one or more counters when a new secure function is initiated, and decrement the one or more counters when a cache line is evicted.

28. The apparatus of item 26, where the cache controller changes at least one or more keys associated with the secure function to rehash the cache block address and generate a new secure index.

29. The apparatus of item 28, where the cache controller further re-keys the cache block address using an incoming secure function and an outgoing secure function to generate the new secure index.

30. The apparatus of item 26, where in performing the cache look-up the look-up controller performs one or more of looking up an incoming secure function and an outgoing secure function at approximately the same time, using the incoming secure function before using the outgoing secure function, and using the outgoing secure function before using the incoming secure function.

31. The apparatus of item 26, where the secure function controller generates an incoming secure function and an outgoing secure function and the cache controller processes the cache block address with one or more of the incoming secure function and the outgoing secure function to generate one or more secure indexes.

32. The apparatus of item 26, where in a first policy the look-up controller uses the incoming secure function first to perform a first cache look-up and responsive to the first cache look-up generating a cache miss the look-up controller further uses the outgoing secure function to perform a second cache look-up and where responsive to whether the second cache look-up generates a cache hit, the look-up controller perform one or more cache line operations.

33. The apparatus of item 32, where responsive to the second cache look-up generating a cache hit the look-up controller performs one or more of flushing or promoting a cache line, otherwise the look-up controller performs a fill of the cache line using the incoming secure function.

34. The apparatus of item 26, where with the second policy the look-up controller uses both the incoming secure function and the outgoing secure function to perform a cache look-up.

35. The apparatus of item 34, where responsive to a cache look-up using the incoming secure function generating a cache miss the look-up controller determines whether a cache look-up using the outgoing secure function is a hit and responsive to the determination the look-up controller performs one or more cache line operations.

36. The apparatus of item 35, where responsive to the cache look-up using the outgoing secure function generating a cache hit the look-up controller performs one or more of flushing or promoting a cache line, otherwise the look-up controller performs a fill of the cache line using the incoming secure function.

37. The apparatus of item 26, where with the third policy the look-up controller uses the outgoing secure function first to perform a first cache look-up and where responsive to the first cache look-up generating a cache hit the look-up controller performs a flush or a promotion of a cache line, otherwise the look-up controller further uses the incoming secure function to perform a second cache look-up and responsive to the second cache look-up not generating a hit the look-up controller performs a cache line fill using the incoming secure function.

38. The apparatus of item 26, where the secure function controller generates the secure function while the look-up controller performs the one or more cache look-ups.

39. The apparatus of item 26, where a subset of bits of the address from which the cache block address is generated comprises a tag portion of the address and does not comprise an offset portion of the address.

The invention claimed is:

1. An apparatus, comprising:
   a cache memory; and
   a cache controller operatively coupled to the cache memory that has at least one processor, a look-up controller and a secure function controller,
   where responsive to a memory instruction access of the cache memory, the cache controller:
   generates a cache block address from a cache address of the memory instruction, the cache block address comprising a plurality of tag bits of the address;
   processes the cache block address with a secure function under control of the secure function controller that uses an associated key to hash the cache block address with the secure function and generate a secure index;
   performs under control of the look-up controller one or more cache look-ups in the cache memory in accordance with one or more look-up policies associated with the secure index; and
   updates one or more counter values of one or more counters associated with the secure function and under control of the cache controller after the one or more cache look-ups;
   where the cache controller is operable to increment the one or more counters when the secure function is used to install a cache line,
   reset the one or more counters when a new secure function is initiated, and
   decrement the one or more counters when a cache line is evicted.

2. The apparatus of claim 1, where the cache controller changes at least one or more keys associated with the secure function to rehash the cache block address and generate a new secure index.

3. The apparatus of claim 2, where the cache controller further re-keys the cache block address using an incoming secure function and an outgoing secure function to generate the new secure index.

4. The apparatus of claim 1, where in performing the cache look-up the look-up controller performs one or more of looking up an incoming secure function and an outgoing secure function at approximately the same time, using the incoming secure function before using the outgoing secure function, and using the outgoing secure function before using the incoming secure function.

5. The apparatus of claim 1, where the secure function controller generates an incoming secure function and an outgoing secure function and the cache controller processes the cache block address with one or more of the incoming secure function and the outgoing secure function to generate one or more secure indexes.

6. The apparatus of claim 1, where in a first policy the look-up controller uses the incoming secure function first to perform a first cache look-up and responsive to the first cache look-up generating a cache miss the look-up controller further uses the outgoing secure function to perform a second cache look-up and where responsive to whether the second cache look-up generates a cache hit, the look-up controller perform one or more cache line operations.

7. The apparatus of claim 6, where responsive to the second cache look-up generating a cache hit the look-up controller performs one or more of flushing or promoting a cache line, otherwise the look-up controller performs a fill of the cache line using the incoming secure function.

8. The apparatus of claim 1, where with the second policy the look-up controller uses both the incoming secure function and the outgoing secure function to perform a cache look-up.

9. The apparatus of claim 8, where responsive to a cache look-up using the incoming secure function generating a cache miss the look-up controller determines whether a cache look-up using the outgoing secure function is a hit and responsive to the determination the look-up controller performs one or more cache line operations.

10. The apparatus of claim 9, where responsive to the cache look-up using the outgoing secure function generating a cache hit the look-up controller performs one or more of flushing or promoting a cache line, otherwise the look-up controller performs a fill of the cache line using the incoming secure function.

11. The apparatus of claim 1, where with the third policy the look-up controller uses the outgoing secure function first to perform a first cache look-up and where responsive to the first cache look-up generating a cache hit the look-up controller performs a flush or a promotion of a cache line, otherwise the look-up controller further uses the incoming secure function to perform a second cache look-up and responsive to the second cache look-up not generating a hit the look-up controller performs a cache line fill using the incoming secure function.

12. The apparatus of claim 1, where the secure function controller generates the secure function while the look-up controller performs the one or more cache look-ups.

13. The apparatus of claim 1, where a subset of bits of the address from which the cache block address is generated comprises a tag portion of the address and does not comprise an offset portion of the address.

* * * * *